(12) United States Patent
Greenhill et al.

(10) Patent No.: US 6,615,987 B1
(45) Date of Patent: Sep. 9, 2003

(54) METHOD OF TREATING AN AQUEOUS SUSPENSION OF KAOLIN

(75) Inventors: David Andrew Greenhill, St. Austell (GB); Anthony Allan May, Sandersville, GA (US); Christopher R. L. Golley, Sandersville, GA (US); Ronald Windell Andrews, Sandersville, GA (US)

(73) Assignee: Imerys Pigments, Inc., Roswell, GA (US)

( * ) Notice: Subject to any disclaimer, the term of this patent is extended or adjusted under 35 U.S.C. 154(b) by 0 days.

(21) Appl. No.: 09/566,130

(22) Filed: May 5, 2000

(Under 37 CFR 1.47)

Related U.S. Application Data

(60) Provisional application No. 60/177,655, filed on Jan. 27, 2000, and provisional application No. 60/133,073, filed on May 7, 1999.

(51) Int. Cl.[7] .............................. B03B 1/00; C04B 14/04
(52) U.S. Cl. .............................. 209/5; 209/11; 106/486
(58) Field of Search .............................. 209/3, 4, 5, 11; 106/416, 439, 446, 468, 486

(56) References Cited

U.S. PATENT DOCUMENTS

| | | | |
|---|---|---|---|
| 2,981,630 A | 4/1961 | Rowland | |
| 3,477,809 A | 11/1969 | Bundy et al. | |
| 3,539,003 A | 11/1970 | Bidwell | |

(List continued on next page.)

FOREIGN PATENT DOCUMENTS

| | | |
|---|---|---|
| GB | 2059811 A | 4/1981 |
| WO | WO93/00999 | 1/1993 |
| WO | WO 98/11993 | 3/1998 |
| WO | WO98/50161 | 11/1998 |
| WO | WO 98/57888 | 12/1998 |
| WO | WO 99/47266 | 9/1999 |
| WO | WO 99/50202 | 10/1999 |

OTHER PUBLICATIONS

Derwent Abstract for CN 1101592, published Apr. 19, 1995.

*Primary Examiner*—Tuan N. Nguyen
(74) *Attorney, Agent, or Firm*—Finnegan, Henderson, Farabow, Garrett & Dunner, L.L.P.

(57) ABSTRACT

A method of treating a kaolin particulate material to improve its properties by removal of impurities which includes the steps of:

(a) producing a dispersed aqueous suspension of a kaolin particulate material containing at least 0.1% by weight, based on the dry weight of the kaolin particulate material, of separable impurity by adding a dispersing agent to the kaolin particulate material to deflocculate solid particles of the material in the suspension;

(b) conditioning the suspension prior to adding selective flocculation polymer thereto by allowing the suspension to age for a period of at least 30 minutes and optionally by adding one or more conditioning chemicals thereto;

(c) adjusting the pH of the suspension to be at least about 9.5;

(d) adding to the suspension at a pH of at least about 9.5 a selective flocculation polymer which facilitates separation of the separable impurity from the kaolin by flocculating the kaolin and allowing the separable impurity to be or remain deflocculated;

(e) allowing the suspension at a pH of at least about 9.5 in a selective flocculation separator to separate into layers comprising a flocculated product layer and a deflocculated impurity layer containing the separable impurity; and (f) extracting the separated layers from the separator.

42 Claims, 2 Drawing Sheets

U.S. PATENT DOCUMENTS

| | | | |
|---|---|---|---|
| 3,586,523 A | 6/1971 | Fanselow et al. | |
| 3,627,678 A | 12/1971 | Marston et al. | |
| 3,655,038 A | 4/1972 | Mercade | |
| 3,701,417 A | 10/1972 | Mercade | |
| 3,808,021 A | 4/1974 | Maynard | |
| 3,837,482 A | 9/1974 | Sheridan, III | |
| 3,857,781 A | 12/1974 | Maynard | |
| 3,862,027 A | 1/1975 | Mercade | |
| 3,879,283 A | 4/1975 | Mercade | |
| 4,018,673 A | 4/1977 | Hughes et al. | |
| 4,045,235 A | 8/1977 | Bidwell et al. | 106/72 |
| 4,075,030 A | 2/1978 | Bundy et al. | |
| 4,076,548 A | 2/1978 | Bundy et al. | |
| 4,078,941 A | 3/1978 | Bundy et al. | |
| 4,088,732 A | 5/1978 | Maynard et al. | |
| 4,105,466 A | 8/1978 | Kunkle et al. | |
| 4,186,027 A * | 1/1980 | Bell et al. | 209/5 X |
| 4,227,920 A | 10/1980 | Chapman et al. | |
| 4,334,985 A | 6/1982 | Turner, Jr. | |
| 4,381,948 A | 5/1983 | McConnell et al. | |
| 4,468,317 A | 8/1984 | Turner, Jr. | |
| 4,472,271 A | 9/1984 | Bacon, Jr. | |
| 4,604,369 A | 8/1986 | Shi | |
| 4,650,521 A | 3/1987 | Koppelman et al. | |
| 4,888,315 A | 12/1989 | Bowman et al. | |
| 5,147,458 A | 9/1992 | Skipper et al. | |
| 5,154,767 A | 10/1992 | Kunkle et al. | |
| 5,190,615 A | 3/1993 | Kunkle et al. | |
| 5,385,239 A | 1/1995 | Kunkle et al. | |
| 5,535,890 A | 7/1996 | Behl et al. | |
| 5,573,658 A | 11/1996 | Kunkle et al. | |
| 5,584,394 A | 12/1996 | Behl et al. | |
| 5,603,411 A | 2/1997 | Williams et al. | |
| 5,685,900 A | 11/1997 | Yuan et al. | |
| 5,938,833 A | 8/1999 | Willis et al. | |
| 6,041,939 A * | 3/2000 | Shi et al. | 209/5 |
| 6,068,693 A | 5/2000 | Garforth et al. | |

* cited by examiner

METHOD OF TREATING AN AQUEOUS SUSPENSION OF KAOLIN

PRIORITY INFORMATION

This application claims the benefit of, and incorporates herein by reference, Provisional Application Ser. No. 60/133,073, filed May 7, 1999, and Provisional Application Serial No. 60/177,655, filed Jan. 27, 2000.

BACKGROUND OF THE INVENTION

Field of the Invention

The present invention relates to a method of treating an aqueous suspension of kaolin to separate impurities therefrom, e.g. to improve the brightness and other properties of the kaolin. The method involves the process of selective flocculation.

Kaolin or kaolinitic clay is a mineral clay containing the particulate mineral kaolinite as its principal constituent. Such clays were formed in geological times by the weathering of the feldspar component of granite. Primary kaolin clays are those which are found in deposits at the site at which they were formed, and are generally present in a matrix of undercomposed granite which must be separated from the clay during the refining process for the clay. For example, kaolin clays mainly of the primary type are obtained from deposits in South West England, France, Germany, Spain and the Czech Republic. Secondary kaolin clays, which are alternatively known as sedimentary kaolin clays, are those which were flushed out in geological times from the granite matrix in which they were formed, and were deposited in an area remote from their site of formation, generally in a basin formed in the surrounding strata. For example kaolin clays obtained from deposits in Georgia, South Carolina and Alabama, USA are generally of the sedimentary (secondary) type.

Kaolin clay is refined and used as an ingredient, pigment or filler material in a variety of application compositions, especially for filling and coating of paper, paper board and like products. Kaolin is a white mineral and is often used in such application compositions to impart, amongst other things, whiteness and brightness. However, one or more desirable properties of the kaolin may be adversely affected by the presence of impurities. Kaolin clays are generally found in association with impurities which are often present in relatively small proportions. The composition and nature of the impurities can vary considerably, depending on the geographical region from which the kaolin clay is obtained. The impurities present can significantly affect the properties of the kaolin clay. The present invention is concerned with treating kaolin clays containing separable impurities therein, especially impurities which comprise particles which are finer than 1 $\mu$m in size, to reduce the amount of such impurities which are present.

A particular impurity which where present in kaolin is often desirable to remove is titanium, e.g. present as titania. This impurity is colored and its presence adversely affects the whiteness and brightness of the kaolin. The titania often contains at least a small percentage of associated iron oxide which either stains the surface of the titania crystals or acts as a substituent in the titania lattice. It is the colored iron oxide associated with but not easily separable from the titania which principally causes the unwanted whiteness and brightness reduction. Titania impurity is found mainly in sedimentary kaolins, e.g. from South East USA, and it is often desirable to remove this impurity from such kaolins.

Other impurities, such as quartz, mica, phosphates, fine clay impurities such as certain smectite clay constituents and various other species, e.g. compounds containing transition elements such as iron, may also be present and may be undesirable in many kaolin product applications. In general, such impurities may be found in either primary or sedimentary kaolin clays. However, the nature and amount of the impurity types present will vary between clay types.

BACKGROUND OF THE INVENTION

Improving the properties of kaolin clays, especially the whiteness and brightness of kaolin clays by the separation therefrom of separable impurities especially titania and iron oxide associated with the titania, has been a major problem facing the kaolin industry in the prior art. Many attempts have been made to solve this problem but none has been entirely satisfactory.

Certain physical beneficiation processes such as magnetic separation (eg as described in WO9850161A) and particle size classification, eg by centrifuging (eg as described in U.S. Pat. No. 4,018,673), have been applied. These are effective for separation of impurities which are not fine, e.g. having a particle size substantially greater than 1 $\mu$m, but are not effective for separating fine impurities, eg having a particle size less than 1 $\mu$m, from kaolin clays.

Various chemical beneficiation methods have been proposed in the prior art for employment to separate fine impurities, especially discoloring titania impurities, from kaolin clays to improve their properties such as their brightness. For example, for this purpose flotation has been described in U.S. Pat. No. 3,655,038, froth flotation has been described in U.S. Pat. No. 4,472,271 and EP-A-591406 and leaching has been described in U.S. Pat. No. 4,650,521. Substantial industrial use has been made of froth flotation. However, this process is expensive to operate but is not adequately effective when applied to kaolin clays containing a significant amount of fine particles, e.g. having a size less than 1 $\mu$m.

Selective flocculation has been described in the prior art for separation of impurities such as titania from kaolin, eg as described in U.S. Pat. No. 3,701,417, WO98/57888, U.S. Pat. No. 5,685,900, U.S. Pat. No. 5,535,890 and U.S. Pat. No. 4,227,920. In U.S. Pat. No. 3,701,417 and WO98/57888 the process described is of a kind operated under conditions such that the titania and other impurities are separated in a flocculated layer and the product is recovered from a deflocculated layer. In the other references the titania and other impurities are separated in a deflocculated layer. Separating the titania in a flocculated lower layer or so called underflow layer is not fundamentally an efficient process because a significant amount of kaolinite, e.g. 20% or more, typically 30% to 45% by weight, of the feed material becomes entrained with the impurity, e.g. titania. Separating the impurity in a deflocculated layer is much more efficient, e.g. the amount of kaolinite present in the impurity layer can be small, e.g. at most a few per cent by weight. The present invention relates to use of selective flocculation of the latter type wherein the separable impurities such as titania are separated in a deflocculated upper or so-called overflow layer.

The methods of the latter type, i.e. which involve separating impurities in a deflocculated layer, described in the aforementioned prior patents are not effective and versatile, e.g. as compared with the method of the invention as demonstrated later, because they rely on the use of a particular feed kaolin and/or on the use of one or more preceding beneficiation steps. For example, the method of U.S. Pat. No. 5,685,900 requires the feed clay itself to be fine and bright and to have been pre-treated by particle size classification and oxidative bleaching prior to selective flocculation. The method of U.S. Pat. No. 4,227,920 relies on prior treatment of the feed kaolin by high gradient magnetic separation and grinding. The method of the invention beneficially does not require the feed kaolin to have these limiting specifications.

An object of the present invention is to provide a method of treating a kaolin particulate material, especially a material which contains fine impurity particles which are required to be separated from the kaolinite in the material, by selective flocculation of the kaolinite and deflocculation of fine impurity particles therein. For example, the fine impurity particles may comprise titania which are required to be removed to improve the brightness and whiteness of the kaolin particulate material. Desirably, such treatment allows such separation to be carried out efficiently and more effectively and in a more versatile manner than prior art treatments.

This and other objects are met by the method of the invention and the benefits thereby obtained will become apparent from the description later in this specification.

SUMMARY OF THE PRESENT INVENTION

According to the present invention there is provided a method of treating a kaolin particulate material to improve its properties by removal of impurities which includes the steps of:

(a) producing a dispersed aqueous suspension of a kaolin particulate material containing at least 0.1% by weight, based on the dry weight of the kaolin particulate material, of fine separable particulate impurity;

(b) conditioning the suspension prior to adding selective flocculation polymer thereto by allowing the suspension to age for a period of at least 30 minutes and optionally by adding one or more conditioning chemicals thereto;

(c) adjusting the pH of the suspension to be at least about 9.5;

(d) adding to the suspension at a pH of at least about 9.5 a selective flocculation polymer which facilitates separation of the separable impurity from the kaolin by flocculating the kaolin and allowing particles of the impurity to be or remain deflocculated;

(e) allowing the suspension containing the polymer added in step(d) in a selective 1 flocculation separator to separate into layers comprising a flocculated product layer and a deflocculated impurity layer containing the separable impurity; and (f) extracting the separated layers from the separator.

The kaolin particulate material may contain at least 0.2% by weight of separable fine particulate impurity, based on the dry weight of the kaolin.

The said pH in steps (c) and (d) is desirably a pH of at least about 9.8, for example a pH of at least about 10.2. A preferred pH is from about 10.5 to about 12.5.

The pH adjustment step (c) is desirably carried out between steps (b) and (d) although part or all of the pH adjustment may be carried out during or before step (b).

The said conditioning step (b) in combination with the said pH of at least 9.5 in steps (d) and (e) improves floc formation and effectiveness in steps (d) and (e) of separation of impurities, especially fine impurities, including but not limited to $TiO_2$, from kaolinite present in the kaolin clay, The said conditioning chemical(s), if applied, in step (b) may comprise a water soluble salt of a monovalent cation, especially of sodium. The conditioning chemical may comprise a halide of a monovalent cation, eg sodium chloride, and/or an organic salt of a monovalent cation, e.g. a sodium carboxylate, eg sodium polyacrylate, such as one of the low molecular weight sodium polyacrylate additives commercially available for use in the dispersion of inorganic particulate materials.

The feed kaolin clay treated by the method of the invention may contain at least 0.5% by weight, in many cases at least 1.0% by weight, in some cases at least 1.5% by weight, based on the dry weight of the kaolin, of impurity to be reduced in content by separation, e.g. $TiO_2$. The $TiO_2$ if present may comprise the anatase and/or rutile form of $TiO_2$. At least 20% by weight, e.g. 30% to 40% by weight or more, preferably at least 50% by weight, of separable $TiO_2$ present in the feed kaolin may be separated from the feed kaolin by the method of the invention. Further $TiO_2$ content and other impurities may be separated by other conventional beneficiation processes, e.g. applied after the selective flocculation separation process.

At least 95%, in many cases at least 97%, by weight of the kaolinite present in the aqueous suspension in step (a) may be separated and recovered from the flocculated product layer in step (e) in the method of the invention.

DESCRIPTION OF THE INVENTION

We have found surprisingly and beneficially that the level of undesirable impurities, especially fine separable impurities such as $TiO_2$, present in a feed particulate kaolin, may be reduced by the method of the invention by an amount which is greater than the reduction provided by prior art methods. This greater reduction surprisingly allows the resulting kaolin, optionally after further conventional processing, to have a beneficial improvement in key properties affected by the impurity. For example, the improved removal of titania allows an improvement in key optical properties, such as brightness and whiteness, to be obtained.

The principal new features in the method of the invention are the conditioning by ageing, optionally together with the addition of a conditioning chemical which is preferably present during part or all of the ageing, prior to the use of a high pH, especially a pH of at least 9.5, during selective flocculation which takes place following addition of the selective flocculation polymer.

The adjustment of pH to a value of at least 9.5, preferably from 10.5 to 12.5, is carried out desirably before addition of the polymer in step (d) The pH may be adjusted in step (c) to be at least 9.5, e.g. from 10.5 to 12.5, usually from 10.5 to 11.5, before or during, preferably after, conditioning in step (b). The pH during conditioning in step (b) may be in the range of from about 6.5 to about 9.5 or more, preferably from about 6.5 to about 7.

Where selective flocculation has been applied industrially in the prior art to remove $TiO_2$ impurities from kaolin, the pH has generally been not greater than 9.5. The benefit of using, in conjunction with conditioning, a higher pH for selective flocculation of kaolinite especially aimed at separation and removal in a deflocculated form of fine titania has not previously been recognized.

Use of a selective flocculation process to treat kaolin at a higher pH is known from U.S. Pat. No. 3,539,003 and subsequent GB-A-2059811B (the assignee of both being predecessor of the present assignee's English affiliate company). However, the treatments described in those references are directed at treating kaolin clays from England which do not contain separable titania. Furthermore, in the method of U.S. Pat. No. 3,539,003, it was considered essential to add an additive such as a calcium salt to provide multivalent ions. No such additive is necessary in the method of the invention. These prior art references have not disclosed nor suggested the use of a conditioning step prior to selective flocculation of kaolinite at high pH, and the benefits to be obtained thereby, as in the method of the invention.

Other undesirable impurities, especially fine impurities, associated with kaolin, such as one or more of mica, feldspar, silicates such as quartz, clay mineral impurities such as smectites and other kandites, phosphates and metal oxides, e.g. of iron and other transition metals, may, alternatively or in addition to titania, be separated by the method of the invention either used alone or in conjunction with one or more other known beneficiation processes.

We have found surprisingly and beneficially that the amount of undesirable impurities, especially fine impurities, i.e., having a mean particle size of less than 1 µm, in many cases less than 0.5 µm, if present in the treated kaolin clay, may be significantly reduced. In particular, we have found that the amount of the undesirable fine impurity halloysite (if present in the feed kaolin) which may be separated from kaolinite in the the feed kaolin may be surprisingly and beneficially be increased by the method of the invention. Halloysite is a fine impurity which may have a deleterious effect upon the rheology of an aqueous suspension of kaolin even if present in a small amount. By providing a greater reduction in the amount of fine impurity such as halloysite having a deleterious effect on rheolgy, the invention allows kaolin product slurries having a high solids concentration to be prepared which are less viscous than those of the same concentration produced by the prior art. This allows, for example, the solids concentration at which the slurry may be prepared, stored, transported, pumped etc and employed in a coating composition to be raised thereby providing significant economic benefits to the user.

Another benefit of the method of the invention is that it allows expensive froth flotation purification processes often employed in kaolin beneficiation to be avoided, if required.

Another benefit of the method of the present invention is that it allows titania-containing and other fine undesirable impurities in kaolin to be reduced to levels such that other conventional kaolin treatment processes which may beneficially be used in treatment of the kaolin to be applied more effectively. For example, such other processes, which may be applied after selective flocculation, may comprise one or more of oxidation, particle size classification, comminution e.g. by grinding using particulate grinding media, magnetic separation, bleaching and dewatering.

In particular, another benefit of the method of the invention is that if a high intensity magnetic separation treatment is subsequently applied to the kaolin product obtained following the selective flocculation process the separation of impurities by such subsequent treatment is enhanced because of the more effective removal of fine impurities, especially fine titania particles where present, by the selective flocculation process.

A further benefit of the method of the invention is that it may be applied at one of various stages of a multi-stage kaolin beneficiation route. We prefer to apply the method of the invention before other beneficiation stages such as one or more of oxidation, comminution, e.g. grinding, particle size classification, e.g. centrifugation, magnetic separation and bleaching. Thus, the kaolin particulate material employed in the method of the invention may comprise crude kaolin which, apart from an optional degritting step applied before or during the method, need not be subject to any other particle separation or beneficiation steps until after treatment by the method of the invention, i.e., after step (f).

A still further benefit is that the fineness and brightness of the feed kaolin treated by the method are not critical, as distinct from prior art methods eg as described in U.S. Pat. No. 5,685,900, for the method to be effective. In particular, the kaolin treated by the method of the invention may comprise a coarse crude kaolin clay having a (water washed) GE brightness of less than 70, e.g. in the range of from 20 to 70, although kaolins having a GE brightness of greater than 70 may also be treated by the method.

All brightness values referred to herein are as measured according to the standard method laid down in TAPPI procedure T-646 05-75.

The method of the invention may be operated as a batch, semi-continuous or continuous process.

The starting material for the method of the invention may comprise a substantially dry, crude kaolin clay. This may be treated by adding water and dispersant (dispersing agent) thereto to produce the dispersed aqueous suspension of step (a). Mechanical working, eg by blunging, is preferably applied to the aqueous suspension produced in step (a), whereby agglomerates present in the kaolin are broken down by the working process. The working process is desirably carried out before conditioning step (b) and may be applied during step (a). Addition of dispersant and application of working may be applied together, in a batch, semi-continuous or continuous process.

Suitable dispersants for the particles of the suspension which may be added thereto in step (a) include the anionic dispersants which have previously been employed in the prior art, especially in a deflocculation/selective flocculation separation process.

For example, the dispersant may comprise an inorganic agent such as an alkali metal silicate, e.g. sodium silicate or potassium silicate, or a condensed phosphate salt such as sodium hexametaphosphate or sodium pyrophosphate. Alternatively, or in addition, the dispersant may comprise an organic agent such as a lignosulfonate, e.g. sodium lignosulfonate, or a polycarboxylate, e.g. a polyacrylate such as a sodium polyacrylate.

In one embodiment of the invention, a suitable dispersant composition for addition to the aqueous suspension comprises an inorganic agent, e.g., a condensed phosphate salt, added in step (a), and a polycarboxylate, e.g., a polyacrylate, of low molecular weight (weight average molecular weight <20,000) added in step (a) or later (as conditioning chemical if added in step (b) after mechanical working). The expression 'polyacrylate' in this specification includes copolymers, known in the art, of acrylic acid with other monomers, e.g., maleic acid or methacrylic acid. In such copolymers, the acrylic acid units may provide at least 50% of the polymer by weight. In such a dispersant composition, the weight ratio (on a dry weight or 'active' basis) of inorganic agent to polycarboxylate may for example be x:1 where x is greater than 1. In such a ratio x may be at least 2.0, e.g., 2.0 to 5.0.

The inorganic agent, e.g. of the said composition, may comprise sodium hexametaphosphate and the polycarboxylate may comprise sodium polyacrylate.

The dispersed aqueous suspension is preferably treated by the mechanical working process at a particle solids concentration of at least about 30%, e.g. at least 40%, particularly at least 50%, in some cases at least 60%, or even 70% or more by weight. A work input of at least 5 kJ.kg$^{-1}$, preferably at least 15 kJ.kg$^{-1}$, e.g. from 20 kJ.kg$^{-1}$ to 100 kJ.kg$^{-1}$, may be applied during the mechanical working process.

Following step (a), including any mechanical working applied, the suspension may optionally be diluted and de.g., ritted to remove large particles still present.

The pH of the aqueous suspension is preferably adjusted prior to step (b), e.g. during step (a). The pH may be adjusted to be 6.5 or more, e.g., from 6.5 to 9.5 or more, especially from 6.5 to 7.5, prior to step (b). The pH may be adjusted prior to step (b) and again later to a higher value during step (c). The pH adjustment of step (c) and any earlier adjustment may each be carried out by adding one or more suitable basic substances, e.g., selected from alkali metal hydroxides and carbonates and ammonium hydroxides and carbonates, such as sodium hydroxide, potassium hydroxide, sodium carbonate or ammonium hydroxide. We prefer to use sodium hydroxide as pH adjusting additive.

The conditioning step (b) and pH adjustment step (c) applied before addition to the suspension of the selective flocculation polymer in step (d) surprisingly and beneficially improve the size and strength of the flocs which are produced after the selective flocculation polymer has been added and thereby improve the effectiveness and efficiency of the separation process, i.e separation of kaolinite flocs from deflocculated impurities. We have found that if the polymer is added soon after step (a) with no pH adjustment as in step (c), the resulting flocs are relatively fine and take a long time to settle. This is undesirable because it reduces product throughput. Also, we have found that this can increase the amount of impurity present in the underflow or product layer in the separation by selective flocculation. Further illustration of the benefit of the conditioning and pH adjustment in the method of the invention is given later.

The conditioning by ageing in step (b) of the method of the invention is carried out for a period of at least about 30 minutes, usually at least 2 hours, prior to the selective flocculation polymer addition in step (d). Ageing for a period of at least 5 hours, e.g. at least 8 to 24 hours, especially for a period of 1 to 7 days, prior to selective flocculation polymer addition, is particularly beneficial.

Where the conditioning includes.in addition to ageing the addition of a conditioning chemical, the conditioning chemical is desirably added prior to ageing. The conditioning chemical may however be added after some or all of the ageing. The conditioning chemical may for example comprise one or more salts of a monovalent ion metal, e.g. one or more sodium salts. The sodium salt(s) may comprise an organic salt, such as a salt of a polycarboxylate, or a halide. Sodium chloride is preferred as halide. Sodium polyacrylate is preferred as polycarboxylate. Sodium polyacrylate, where employed, may be one of the commercially available products employed as mineral dispersants.

The conditioning chemical(s) optionally added in step (b) may be added to the kaolin suspension via one or more static in-line mixers. Alternatively, the chemical(s) can be added to the kaolin suspension in one or more conventional mixers using mechanical agitation means to ensure good mixing.

Preferably, during the conditioning by ageing in step (b), especially if the suspension contains one or more conditioning chemicals, the suspension is mechanically agitated, e.g., by stirring or recirculation. Such agitation may be light and may be applied continuously, semi-continuously or intermittently.

The selective flocculation polymer added in step (d) is conveniently mixed with the kaolin suspension prior to delivery of the mixture of the two to the selective flocculation separator. Conveniently these two ingredients are thoroughly mixed together prior to delivery to the separator. The selective flocculation polymer may be added via one or more static in-line mixers. Alternatively the selective flocculation polymer can be added to the kaolin suspension in one or more conventional mixers using conventional mechanical agitation means to ensure good mixing.

The selective flocculation polymer may be added in one or more doses at one or more addition points prior to delivery of the suspension to the separator.

The feed aqueous suspension to be delivered to the selective flocculation separator may have a specific gravity in the range of from 1.03 to 1.15. The solids content of the suspension may accordingly be in the range 5% to 21%, e.g., 10% to 15%, by weight. Dilution with water may be carried out before the delivery to the separator, desirably before addition of the selective flocculation polymer.

The feed aqueous suspension to be delivered to the selective flocculation separator, e.g. after mechanical working and subsequent conditioning and prior to selective flocculation polymer addition, may beneficially be heated, e.g., by use of hot water in a water dilution stage and/or by passage of the suspension through an external heater, e.g., a heating jacket of a heat exchanger, e.g. to raise the temperature by at least 10° C., e.g. from about 15–20° C. to about 30–35° C. or more.

The polymer added in step (d) of the method of the invention may be one of the selective flocculation polymers previously known or used in the art to flocculate kaolinite but to leave impurities deflocculated. The organic polymers useful as the selective flocculation polymer in carrying out the method of the invention include water-soluble weakly anionic organic polyelectrolytes having an average molecular weight greater than about 10,000, especially greater than about 100,000, in many cases greater than about 1,000,000. Weakly anionic polymers may contain both anionic and non-ionic groups. Anionic properties may be imparted to synthetic non-ionic organic polymers for example by the presence of side chains of anionic groups, such as carboxylic acid, carboxylic anhydride and carboxylic acid salt groups. Non-ionic groups in a side chain in the polymer may also be present resulting from the presence of certain hydrophilic groups, e.g., one or more of the following hydrophilic groups: carboxylic acid amide, carboxy alkyl ester, pyrrolidone, hydroxy, hydroxy alkyl ether and alkoxy. Because of their commercial availability high molecular weight weakly anionic synthetic polymers such as polyacrylamides containing some replacement, e.g. from 1% to 20% by weight, often from 1% to 15% by weight, especially from 1% to 10% by weight of amide groups by carboxylic groups are suitable. Such polyelectrolytes are prepared by copolymerization of the non-ionic monomer(s), e.g. acrylamide, and one or more suitable carboxylic acids, e.g., acrylic acid, or by the partial hydrolysis of non-ionic polymer(s), e.g. polyacrylamide.

The concentration of the polymer in the suspension in step (e) of the method of the invention may be in the range of from 0.001% to 0.5%, preferably from 0.05% to 0.5% by weight based on the dry weight of kaolin present.

The specific gravity of the overflow or deflocculated impurity-containing aqueous layer produced by separation from kaolinite in the selective flocculation process in step (e) of the method according to the invention may be about 1.001 or more, e.g. in the range 1.001 to 1.03. Adjustment of the specific gravity may be made by adjustment of the dose of the selective flocculation polymer added to the suspension to be treated.

Following formation of the layers in step (e), the layer of deflocculated impurities may be separated from the layer of flocculated kaolin particles in step (f) by conventional means, e.g., elutriation, decanting or siphoning using batch operation or in a continuous separator. The flocculated kaolin suspension extracted in step (f) may be further treated in a known manner, e.g. by optional high shear pumping or mixing to break up the flocs followed by one or more further beneficiation processes, e.g. one or more of oxidation, comminution, e.g. grinding, particle size classification, e.g., screening and/or centrifugation, magnetic separation, bleaching, washing, and dewatering, e.g. spray drying. Preferably, after separation of the flocculated kaolin product suspension and before further processing of the same, the pH of the flocculated kaolin product suspension is reduced in a well known way by adding an acidic substance, e.g. to about 7 or less.

Prior to or during further processing, the flocculated kaolin suspension extracted in step (f) may be further treated in another selective flocculation step applied to provide further purification of the kaolin. For example, the suspension obtained may be cleaned by washing with clean water, and treated by repeating one or more of the steps previously applied prior to polymer addition. Further selective flocculation polymer, which may be the same as or different from that employed in the earlier step (e) may then be added at the appropriate stage. The suspension is again allowed to separate in a selective flocculation separator and the respective layers formed are subsequently extracted as in the earlier selective flocculation and extraction steps (e) and (f).

The kaolin suspension treated in the method of the invention and extracted as the product layer in step (f) may, optionally following a treatment step to break down the flocs therein; beneficially be treated by an oxidizing agent to oxidize residual polymers and other oxidizable impurities present in the suspension following the selective flocculation process(es).

The oxidizing agent may comprise ozone applied to the separated kaolin product suspension in a conventional ozonizer, e.g., in gaseous form, bubbled into the suspension.

The separated and extracted impurity-containing deflocculated material may be discarded or further treated to recover, purify and use ingredients therein, e.g., $TiO_2$. Water in the material may be separated by dewatering and may be purified and recycled for re-use in the same process or in a different process in a known manner.

As described earlier, the resulting kaolin optionally after further processing steps, may show properties superior to those obtained by comparable prior art processes.
The resulting kaolin may for example have the following product properties:

% residual $TiO_2$:<0.7% by weight (based on the dry weight of kaolin);

GE brightness: at least 88, preferably at least 91.

Although the invention is effective in treating kaolin-containing inorganic particulate materials having a wide range of particle size properties, it is particularly suitable for producing fine materials suitable for use as pigments in paper products. For example, the product produced may have the following properties:

mean particle size: from 0.2 $\mu$m to 5 $\mu$m, e.g. from 0.2$\mu$m to 1.5 $\mu$m;

percentage (by weight) of particles having a size less than 2 $\mu$m: at least 60%, in some cases at least 80%, preferably for very fine clays at least 90% by weight;

In this specification, titania and iron oxide amounts are as measured by a Philips Minimate™ GXPS1 analyzer fitted with a 10 kV/0.15 mA Sn X-ray source using approximately 1 g of dried and milled powder for the measurement.

In this specification, particle size (equivalent spherical diameter) distribution and mean size measurements are as measured in a well known manner by sedimentation of a fully dispersed dilute suspension of the particles in a standard aqueous medium using a SEDIGRAPH™ 5100 machine supplied by Micromeritics Corporation.

DESCRIPTION OF ILLUSTRATIVE EMBODIMENTS

Embodiments of the present invention will now be described by way of example with reference to FIG. 1. In the following description, percentage by weight values given for additives are, unless otherwise stated, percentages by weight of dry or active amounts of the additives based upon the dry weight of the inorganic particulate material present in the treated suspension.

Figure 1:
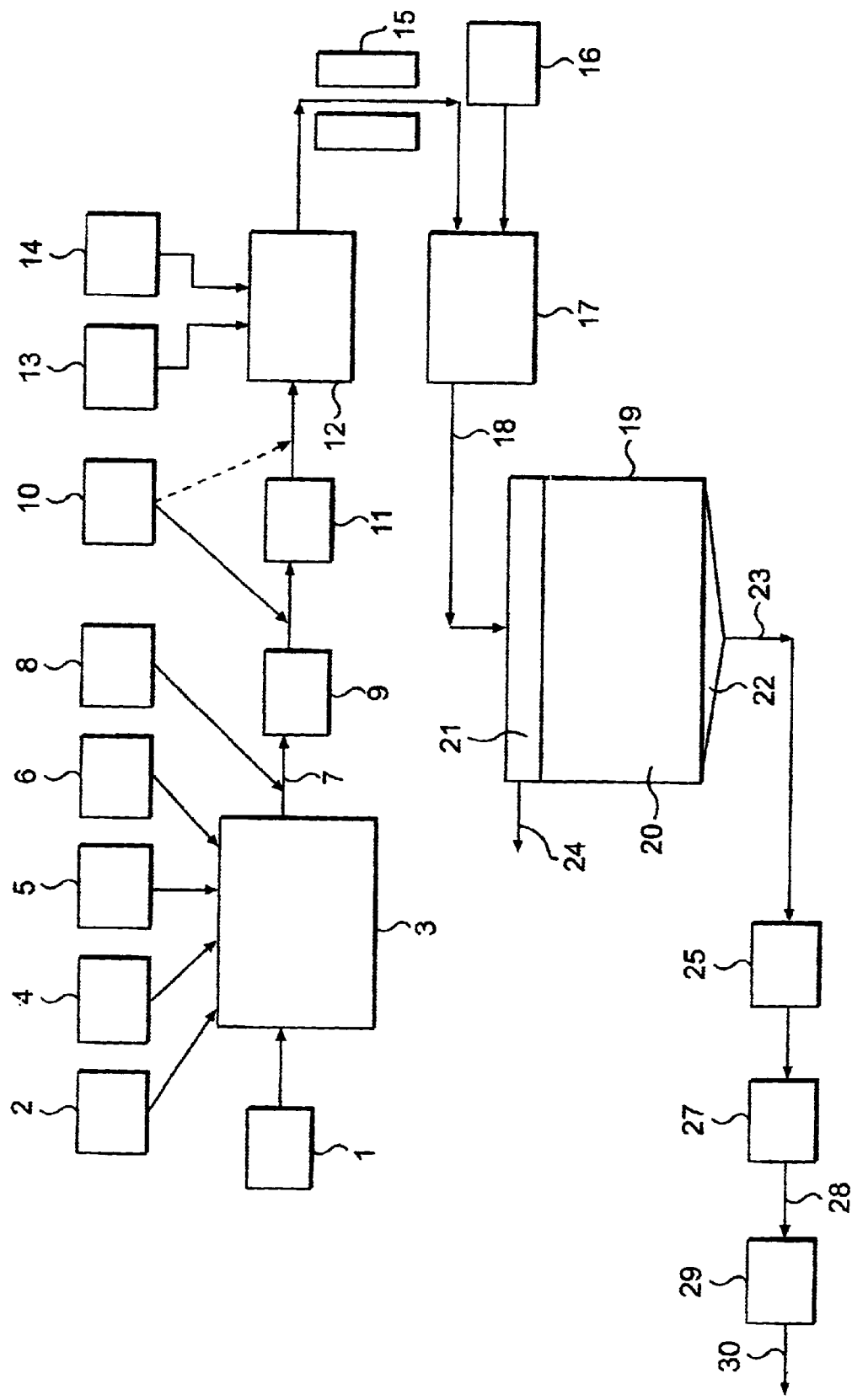
FIG. 1 is a diagrammatic flow sheet of a method of treating an aqueous kaolin suspension in accordance with an embodiment of the invention.

As seen in FIG. 1, crude, particulate kaolin obtained from Georgia, USA is delivered as a substantially dry solid material from a source 1 together with water from a source 2 to a blunger 3. An aqueous suspension having a solids content of at least 30%, e.g. from 40% to 70% or more by weight, is formed in the blunger 3. The following ingredients are also added to the suspension being treated in the blunger 3:

(a) inorganic dispersant, e.g. sodium hexametaphosphate, from a source 4;

(b) alkali, e.g. sodium hydroxide or sodium carbonate, from a source 5; and (c) optionally organic polyelectrolyte dispersant, e.g., sodium polyacrylate, from a source 6.

The materials from the sources 1, 2, 4, 5 and 6 are thoroughly mixed and worked together in the blunger 3. Mechanical working of the aqueous suspension of kaolin in the blunger 3 is applied to break down agglomerates of solid particles. The resulting dispersed suspension has a pH of about 6.5–7. An output stream 7 comprising the dispersed suspension after treatment in the blunger 3 is supplied, optionally after dilution with water from a source 8, to a de.g.,ritter 9 where large particles, are separated and removed. Conditioning chemical, e.g. a sodium halide and/or a sodium polycarboxylate, may be added from a source 10. The de.g.,ritted kaolin suspension is then delivered to a conditioning tank 11 where the suspension is allowed to stand with gentle mechanical stirring for an ageing period, e.g. for at least 30 minutes, preferably for several hours or days. After conditioning by ageing, further optional conditioning chemical may be added (in addition to or instead of that applied prior to ageing) from the chemical additive source 10. The suspension is delivered to a mixer 12. The suspension may optionally be diluted by addition of water from a source 13 to adjust the specific gravity of the suspension. The pH of the suspension is adjusted to be at least 9.5 by addition of alkali such as sodium hydroxide or sodium carbonate from a source 14. An output stream from the mixer 12 consists of the kaolin suspension plus additives having a low solids concentration for example of from 10% to 15% by weight and a pH of at least 9.5. The suspension is optionally passed through a heater 15 (e.g. a heat exchanger) which heats the suspension to a temperature of about 30° C.–40° C. A stream of the suspension optionally heated by the heater 15 is delivered to a mixer 17 where selective flocculation polymer consisting of a high molecular weight polyacrylamide having less than about 15% by weight of anionic groups is added from a source 16. The output of the mixer 17 is a stream 18 of the suspension which is delivered as a feed to a separator 19 in which separation of kaolinite from impurities by selective flocculation takes place. Following this separation, a flocculated underflow layer 20 and a deflocculated overflow layer 21 are formed. A product stream 23 from the underflow layer 20 comprising beneficiated kaolin flocs is collected from the separator 19 at its base 22. A waste stream 24 comprising deflocculated impurities separated by the selective flocculation process in the overflow layer 21 is extracted from an upper re.g.,ion of the separator 19.

The suspension of kaolin in the product stream 23 is passed, optionally after shearing of the flocs therein by a shearing device 25, through an ozonizer 27 in which ozone gas is applied thereto. The concentration of ozone employed may be as in the prior art, e.g. from 0.01% to 0.05% by weight. The ozone breaks down residual polymer and other oxidizable impurities, e.g., organic coloring contaminants, present in the suspension. An output stream 28 from the ozonizer 27 is delivered to a plant 29 in which the beneficiated kaolin suspension is further treated by conventional processing steps as described earlier to produce a commercially acceptable pigment product 30 available in dry or slurry form as required, e.g. having the properties described earlier.

Examples of the treatment of kaolin suspensions or slurries using the method embodying the invention illustrated in FIG. 1 as well as comparative prior art methods are as follows. In each of these Examples, where a percentage value of an additive or ingredient is stated this is the percentage by weight on a dry or active basis based on the dry weight of kaolin present in the slurry.

EXAMPLE 1

The effect of pH during selective flocculation of the treated slurry was investigated as follows.

A slurry of a crude kaolin from Georgia, USA having a $TiO_2$ impurity content of about 2% by weight was prepared and treated in the manner generally as described earlier with reference to FIG. 1 but in several runs at different pH values using, where appropriate, either ammonium hydroxide solution or sodium hydroxide solution (from source 14 in FIG. 1) as alkali added following conditioning by ageing and prior to selective flocculation polymer addition to adjust pH. Blunging in each case was carried out at 65% solids using 0.25% active sodium hexametaphosphate and 0.1% active fully neutralized sodium polyacrylate commercially available as the product C211. Ageing in each case was carried out after blunging for a period of about 18 hours. After ageing, the pH was adjusted as described earlier and then selective flocculation polymer was added. The selective flocculation polymer added in each case was 0.05% of a high molecular weight acrylamide having less than 15% by weight of acrylic acid neutralized. In each case, the overflow specific gravity was adjusted to 1.005.

In each run, selective flocculation of the sample slurry was investigated as a batch operation experiment. The minimum settling time of each sample slurry was measured. This is the time required for the flocculated layer to reach 50% of the original slurry volume. The $TiO_2$ content and GE brightness of a dried sample of the resulting kaolin product following selective flocculation in each case were also measured.

The results which were obtained are given in Table 1 as follows.

TABLE 1

The effect of pH upon $TiO_2$ removal

| Run No | PH | Added Alkali | Settling time (sec) | Product Brightness (GE) | Product $TiO_2$ content (wt %) |
|---|---|---|---|---|---|
| 1 | 6.5 | none | 10 | 85.4 | 1.347 |
| 2 | 7.5 | $NH_4OH$ | 22 | 85.0 | 1.266 |
| 3 | 7.5 | NaOH | 15 | 85.0 | 1.389 |
| 4 | 8.5 | NaOH | 20 | 85.2 | 1.384 |
| 5 | 9.5 | $NH_4OH$ | 90 | 87.4 | 0.752 |
| 6 | 9.5 | NaOH | 25 | 85.7 | 1.266 |
| 7 | 10.5 | $NH_4OH$* | 20 | 87.8 | 0.701 |
| 8 | 10.5 | NaOH | 30 | 87.4 | 0.761 |
| 9 | 11.0 | NaOH | 35 | 87.5 | 0.700 |
| 10 | 11.5 | NaOH | 20 | 87.8 | 0.697 |

*In order to reduce settling time 0.003% active NaCl was added in this case following ageing.

Figure 2:
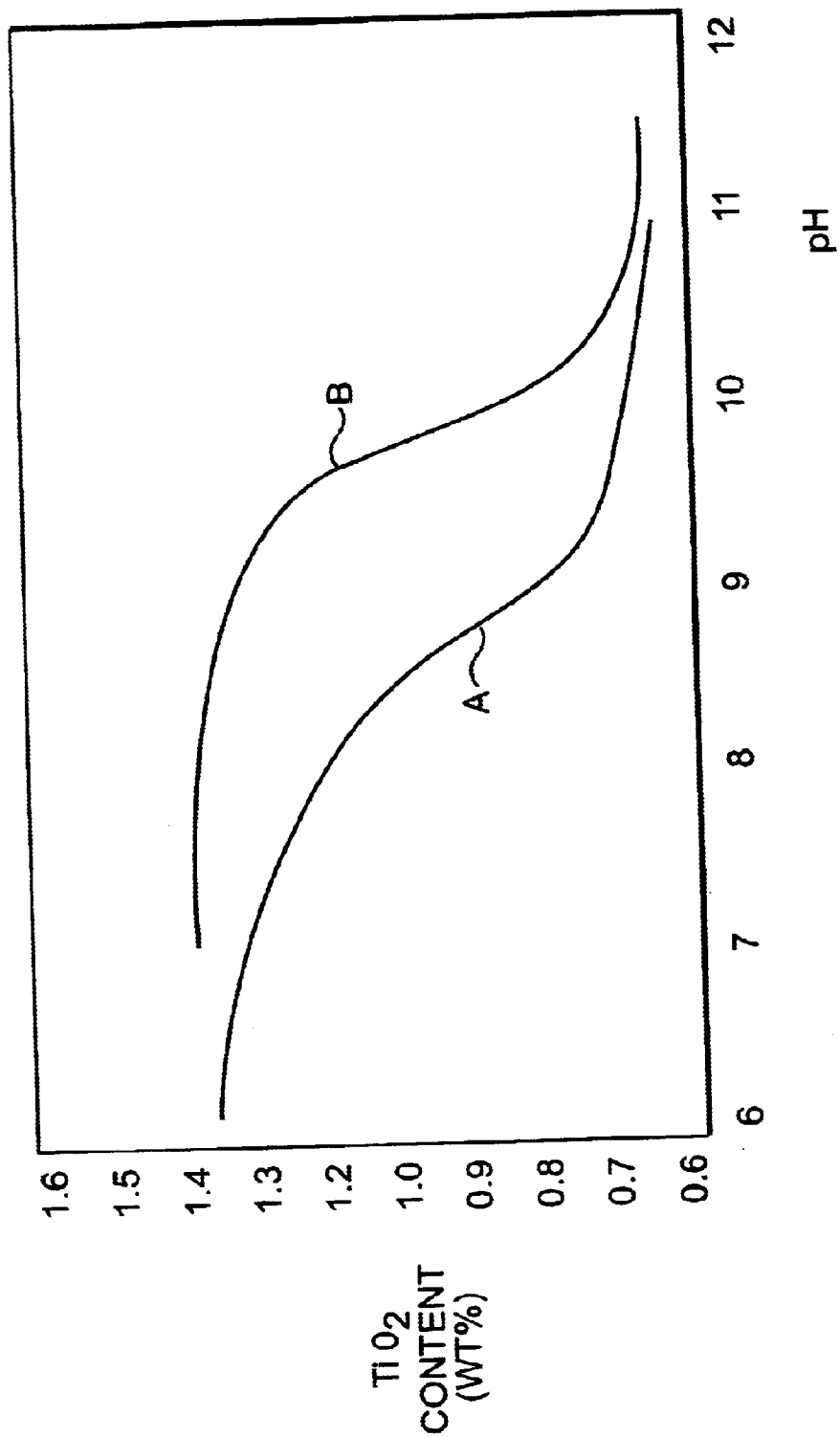
FIG. 2 is a graph of remaining $TiO_2$ content versus pH for treatment of a kaolin suspension by selective flocculation at different pH values.

The results obtained are plotted graphically in FIG. 2. As seen in FIG. 2, a rapid change in $TiO_2$ content of the resulting product occurs as the pH employed for selective flocculation is increased. Using $NH_4OH$, curve A in FIG. 2, the steepest part of the change occurs between a pH of 8.5 and a pH of 9.5. Using NaOH, curve B in FIG. 2, the steepest part of the change occurs between a pH of 9.5 and a pH of 10.5. NaOH is preferred because of the quicker settling time obtained by using it and because it causes few bacterial contamination problems.

It should be noted that the product brightness measured as shown in Table 1 is that obtained following use of selective flocculation. Further improvement in the product brightness in this and later Examples may be obtained, e.g. to GE values greater than 90, by application of conventional further processing steps, e.g. as set out earlier, following selective flocculation. Generally, the final product brightness obtained will be higher in cases where the product $TiO_2$ concentration following the selective flocculation process is lower (i.e., by the method of the invention).

EXAMPLE 2

The effect of addition of polyacrylate as conditioning chemical to the kaolin slurry subject to selective flocculation was investigated as follows. A kaolin crude slurry having a $TiO_2$ content of about 2% was prepared and treated in several runs in the manner described in Example 1, except that the following conditions were applied in this Example. The pH was either 10.5 or 11.5 during selective flocculation, no polyacrylate was added at the blunging stage and the input slurry in each case had a specific gravity of 1.066 prior to selective flocculation, the overflow specific gravity being maintained at 1.002. The selective flocculation polymer dose was approximately 0.035%. No sodium polyacrylate C21 1 was added to the treated slurry in two of the runs and C211 was added following blunging and dilution (e.g. as indicated in FIG. 1 from source 10) in an active amount of 0.1% by weight in another two of the runs. The settling time (defined earlier) during selective flocculation and the resulting product brightness and $TiO_2$ content of a dry sample after selective flocculation were measured in each case. The results obtained are shown in Table 2 as follows.

TABLE 2

The effect of polyacrylate addition upon $TiO_2$ removal

| PH | C211 dosing details | Product Brightness (GE) | Product $TiO_2$ (wt %) | Settling time (sec) |
|---|---|---|---|---|
| 10.5 | no C211 | 84.5 | 1.255 | 10 |
| 10.5 | 0.1% C211 | 85.6 | 1.006 | 25 |
| 11.5 | no C211 | 85.2 | 1.098 | 10 |
| 11.5 | 0.1% C211 | 86.2 | 0.873 | 25 |

Table 2 shows that adding polyacrylate as part of the conditioning prior to adjustment to high pH and subsequent addition of the selective flocculation polymer has a further beneficial effect on reducing $TiO_2$ content and improving brightness in the resulting product slurry.

EXAMPLE 3

The effect of conditioning by ageing was investigated as follows.

A kaolin slurry was treated as in Example 2 and generally with reference to FIG. 1, by using 0.1% by weight of C211 sodium polyacrylate added following the blunging stage and prior to ageing. Selective flocculation was carried out using a pH of 11.5. One sample A of the slurry was treated after a period of 10 minutes following C211 polyacrylate addition by pH adjustment and then addition of the selective flocculation polymer to produce selective flocculation. Another sample B of the slurry was aged with gentle stirring following addition of the C21 1 polyacrylate for a period of about 3 days prior to pH adjustment and then selective flocculation by addition of the selective flocculation polymer. The brightness and titania content of the resulting kaolin product were measured in each case as described in Example 1 and the results obtained are shown in Table 3 as follows.

TABLE 3

EFFECT OF AGEING

| Sample | pH | Ageing period | Product Brightness (GE) | Product $TiO_2$ content (wt %) |
|---|---|---|---|---|
| A | 11.5 | 10 minutes | 86.0 | 0.97 |
| B | 11.5 | 3 days | 87.3 | 0.77 |

As seen in Table 3, extended ageing, in this case for a period of 3 days following plyacrylate addition, beneficially reduces the $TiO_2$ content and improves the brightness of the kaolin product obtained following selective flocculation.

EXAMPLE 4

The effect of temperature of the kaolin slurry during selective flocculation was investigated as follows.

Four selective flocculation experiments on a slurry of another crude kaolin obtained from Georgia, USA were carried out in the manner described earlier with reference to FIG. 1 and Example 2. In this case, however, during selective flocculation the pH was either 7.2 or 10.3 and during selective flocculation the slurry temperature was either 12° C. or 32° C. The adjustments of pH and temperature were made prior to addition of the selective flocculation polymer. The amount of selective flocculation polymer added following ageing and subsequent pH adjustment in each case was 0.0235% by weight. The $TiO_2$ impurity content and brightness of dry samples of the resulting kaolin product following selective flocculation were measured and the results obtained are shown in Table 4 as follows.

TABLE 4

EFFECT OF TEMPERATURE

| Sample No. | pH | Temperature (° C.) | Product $TiO_2$ content (wt %) | Product brightness (GE) |
|---|---|---|---|---|
| 1 | 7.2 | 12 | 1.490 | 84.0 |
| 2 | 10.3 | 12 | 1.212 | 85.3 |
| 3 | 7.2 | 32 | 1.436 | 84.2 |
| 4 | 10.3 | 32 | 1.096 | 85.7 |

Table 4 shows that increasing temperature of the kaolin slurry subject to selective flocculation is beneficial in reducing $TiO_2$ impurity content and increasing product brightness, but this effect is most beneficial following conditioning and the use of higher pH.

We claim:

1. A method of treating a kaolin particulate material to improve one or more of its properties by removal of impurity particles therein which includes the steps of:
    (a) producing a dispersed aqueous suspension of a kaolin particulate material containing at least 0.1% by weight, based on the dry weight of the kaolin particulate material of separable particulate impurity;
    (b) conditioning the suspension prior to adding selective flocculation polymer thereto by allowing the suspension to age for a period of at least 30 minutes and optionally by adding one or more conditioning chemicals thereto;
    (c) adjusting the pH of the suspension to be at least about 9.5;
    (d) adding to the suspension at a pH of at least about 9.5 a selective flocculation polymer which facilitates separation of the separable impurity from the kaolin by flocculating the kaolin and allowing particles of the impurity to be or remain deflocculated;
    (e) allowing the suspension containing the polymer added in step(d) to separate in a selective flocculation separator into layers comprising a flocculated product layer and a deflocculated impurity layer containing the separable impurity; and
    (f) extracting the separated layers from the separator.

2. A method as claimed in claim 1 wherein the pH is adjusted to be at least about 9.8 in step (c) and steps (d) and (e) are carried out at that pH.

3. A method as claimed in claim 2 wherein the said pH in steps (d) and (e) is at least about 10.2.

4. A method as claimed in claim 3 wherein the said pH in steps (d) and (e) is from about 10.5 to about 12.5.

5. A method as claimed in claim 1 wherein the kaolin particulate material in step (a) contains at least 0.1% by weight of separable titania impurity based on the dry weight of the kaolin particulate material.

6. A method as claimed in claim 5 wherein the titania impurity incorporates associated iron oxide impurity.

7. A method as claimed in claim 5 wherein the kaolin of the aqueous suspension treated by the method of the invention incorporates in step (a) at least 0.5% by weight of $TiO_2$ present as an impurity based on the dry weight of the kaolin.

8. A method as claimed in claim 7 wherein the amount of $TiO_2$ present in the flocculated product layer is at least 25% less than that present in the kaolin particulate material in step (a), the amount of $TiO_2$ in each case being measured as a percentage by weight based on the dry weight of the kaolin particulate material.

9. A method as claimed in claim 7 wherein the kaolin particulate material in step (a) comprises a sedimentary kaolin clay mineral.

10. A method as claimed in claim 1 wherein the kaolin particulate material in step (a) comprises a primary kaolin clay mineral.

11. A method as claimed in claim 1 wherein the kaolin particulate material in step (a) has a washed GE brightness of less than about 70.

12. A method as claimed in claim 1 wherein the kaolin particulate material in step (a) has a washed GE brightness of at least about 70.

13. A method as claimed in claim 1 wherein step (a) is carried out by adding water and dispersing agent to a substantially dry crude kaolin clay.

14. A method as claimed in claim 1 wherein the kaolin of the aqueous suspension in step (a) incorporates halloysite as an impurity and wherein in step (e) halloysite is present in the impurity layer and the amount of halloysite present in the product layer is reduced compared with the amount present in the kaolin particulate material in step (a).

15. A method as claimed in claim 1 wherein prior to step (b) the aqueous suspension is treated by a mechanical working process to deagglomerate the particulate kaolin material.

16. A method as claimed in claim 15 wherein in the mechanical working process the aqueous suspension has a solids content of at least 30% by weight.

17. A method as claimed in claim 15 wherein the mechanical working process is carried out together with dispersing agent addition during step (a).

18. A method as claimed in claim 15 wherein the mechanical working process comprises blunging.

19. A method as claimed in claim 15 wherein at least 5kJ is dissipated in the mechanical working process per kilogram of kaolin particulate material present in the aqueous suspension on a dry weight basis.

20. A method as claimed in claim 1 wherein step (c) is applied between steps (b) and (d).

21. A method as claimed in claim 1 wherein the pH is adjusted during or prior to step (b).

22. A method as claimed in claim 21 wherein the pH of the suspension is adjusted to be at least about 6.5 prior to step (b).

23. A method as claimed in claim 1 wherein a conditioning chemical is added to the aqueous suspension prior to or during ageing in step (b).

24. A method as claimed in claim 15 wherein the conditioning step (b) comprises adding a sodium salt to the suspension following step (a) and prior to at least some of the ageing.

25. A method as claimed in claim 1 wherein the conditioning step (c) includes ageing the suspension for at least about 30 minutes.

26. A method as claimed in claim 25 wherein the conditioning step (c) comprises ageing the suspension for at least about five hours.

27. A method as claimed in claim 1 wherein the aqueous suspension is mechanically agitated during ageing.

28. A method as claimed in claim 1 wherein the aqueous suspension is heated prior to addition of the selective flocculation polymer to the aqueous suspension.

29. A method as claimed in claim 20 wherein following the conditioning step (b) and prior to addition of the selective flocculation polymer to the aqueous suspension in step (d) the aqueous suspension is heated.

30. A method as claimed in claim 13 wherein, prior to step (d), water is added to the aqueous suspension to adjust the solids content of the suspension to from about 5% to about 15% by weight.

31. A method as claimed in claim 1 wherein the selective flocculation polymer comprises a weakly anionic organic polymer having a molecular weight greater than 100,000.

32. A method as claimed in claim 31 wherein the selective flocculation polymer has a molecular weight greater than 1,000,000.

33. A method as claimed in claim 31 wherein the selective flocculation polymer comprises an acrylamide polymer containing anionic units, the anionic units forming not more than 15% by weight of the polymer.

34. A method as claimed in claim 31 wherein the total amount of the polymer added in step (d) is from about 0.01% to about 0.5% on a dry weight basis, based on the dry weight of kaolin in the aqueous suspension.

35. A method as claimed in claim 31 wherein the specific gravity of the deflocculated impurity-containing layer in step (e) is in the range of from about 1.001 to about 1.03.

36. A method as claimed in claim 1 wherein, following step (f), the flocculated product layer is redispersed in water and treated by a further selective flocculation process.

37. A method as claimed in claim 1 wherein, following step (f), an aqueous kaolin suspension obtained from the flocculated product layer is treated, after optional shearing, by an oxidizing agent.

38. A method as claimed in claim 37 wherein the oxidizing agent comprises ozone.

39. A method as claimed in claim 15, wherein the mechanical working process comprises blunging and the kaolin particulate material in step (a) comprises a crude sedimentary kaolin, which prior to or during said method may optionally be degritted but is not subjected to any other beneficiation treatment until after steps (a) to (f) have been applied.

40. A method as claimed in claim 39 wherein the crude sedimentary kaolin has a washed GE brightness of less than about 70 and greater than about 20.

41. A method as claimed in claim 39 wherein the crude sedimentary kaolin has a washed GE brightness of not less than about 70.

42. A method as claimed in claim 1 which is carried out as a continuous or semi-continuous process.

* * * * *